US006656875B1

(12) United States Patent
Le Loarer et al.

(10) Patent No.: US 6,656,875 B1
(45) Date of Patent: Dec. 2, 2003

(54) ALUMINA EXTRUDATES, METHODS FOR PREPARING AND USE AS CATALYSTS SUPPORTS

(75) Inventors: Jean-Luc Le Loarer, Salindres (FR); Hubert Nussbaum, Boisset Et Gaujac (FR); Denis Bortzmeyer, Vincennes (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/445,753

(22) PCT Filed: Jun. 10, 1998

(86) PCT No.: PCT/FR98/01186

§ 371 (c)(1),
(2), (4) Date: Feb. 18, 2000

(87) PCT Pub. No.: WO98/56499

PCT Pub. Date: Dec. 17, 1998

(30) Foreign Application Priority Data

Jun. 10, 1997 (FR) .............................................. 97 07146

(51) Int. Cl.[7] .......................... B01J 21/00; B01J 21/02; B01J 21/04
(52) U.S. Cl. ...................... 502/355; 502/341; 502/415; 502/527.14; 502/527.15; 502/527.16
(58) Field of Search ................................ 502/355, 415, 502/341, 527.14, 527.15, 527.16

(56) References Cited

U.S. PATENT DOCUMENTS

| 3,856,708 A | * | 12/1974 | Carithers ..................... 252/463 |
| 4,344,928 A | * | 8/1982 | Dupin et al. ................. 423/626 |
| 4,499,203 A | * | 2/1985 | Toulhoat et al. ............. 502/247 |
| 4,579,728 A | | 4/1986 | Schoenthal et al. |
| 5,744,420 A | * | 4/1998 | Le Loarer et al. .......... 502/415 |

FOREIGN PATENT DOCUMENTS

| DE | 2758945 | 7/1979 | |
| DE | 273780 A | * 11/1989 | ............ B01J/20/28 |
| DE | 4311650 | 10/1994 | |
| EP | 0015801 | 9/1980 | |
| EP | 0353129 | 1/1990 | |
| EP | 0455307 A1 | * 11/1991 | ............ B01J/23/00 |
| FR | 2299911 | 9/1976 | |
| FR | 2528721 | 12/1983 | |
| FR | 2537889 | 6/1984 | |
| FR | 2556235 | 6/1985 | |

* cited by examiner

Primary Examiner—Stanley S. Silverman
(74) Attorney, Agent, or Firm—Millen, White, Zelano & Branigan, P.C.

(57) ABSTRACT

The present invention concerns alumina extrudates with characteristics, in particular porosity, which are adapted for their use as catalyst supports or catalysts, in particular for hydrotreating petroleum cuts.

Figure 1:
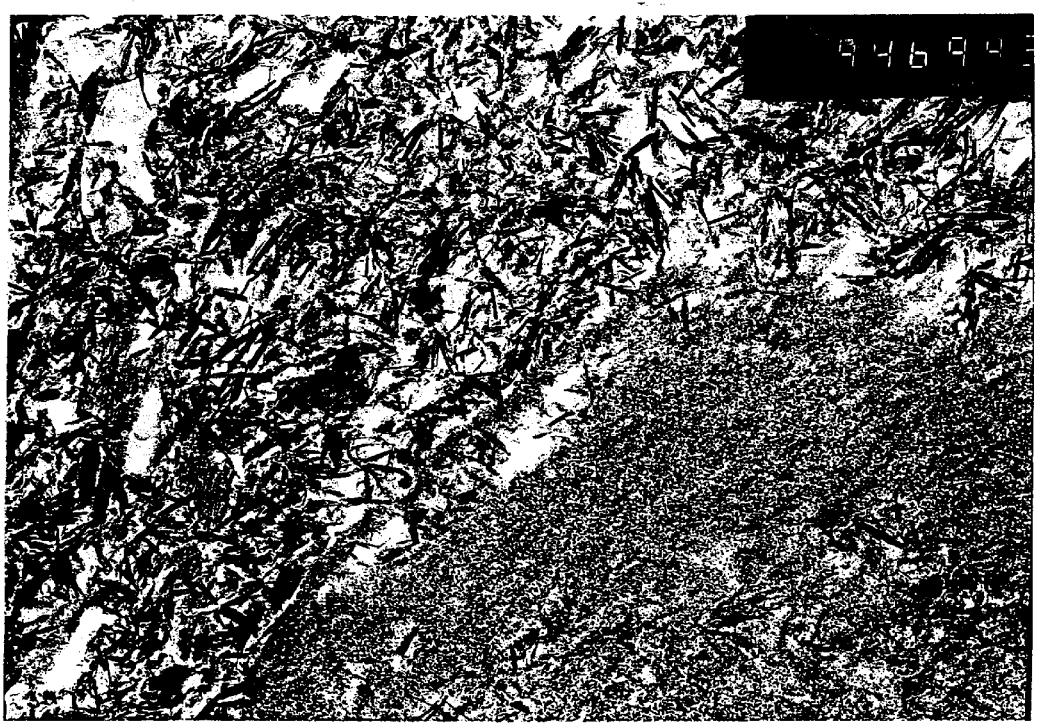

It also concerns processes for forming the alumina to achieve the properties of the extrudates of the invention.

41 Claims, 1 Drawing Sheet

ALUMINA EXTRUDATES, METHODS FOR PREPARING AND USE AS CATALYSTS SUPPORTS

This is a national stage application (Rule 371) of PCT international Application Number PCT/FR98/01186 filed on Jun. 10, 1999.

The present invention relates to novel alumina-based extrudates. It also relates to processes for preparing these extrudates and to their use as catalyst supports, in particular for hydrotreatment.

Hydrotreatment of petroleum cuts is a purification operation carried out in hydrogen which encompasses several types of treatment, in particular: hydrodesulphurisation, hydrodemetallisation, hydrodenitrogenation, Conradson Carbon number hydroreduction (HDCC), asphaltene hydrogenation (HDAS) and aromatic hydrogenation (HDAr).

Hydrodemetallisation can eliminate metals, in particular nickel and vanadium, contained in the heavy petroleum fractions from vacuum distillation of the first refinery stages.

Hydrodesulphurisation can eliminate sulphur-containing compounds such as RSH or $R_2S$, R being an alkyl radical. It is primarily used on light petroleum fractions or those with a low metals (Ni and V) content.

When hydrotreating heavy petroleum cuts, it is important for the catalyst used to be equilibrated for hydrodemetallisation and hydrodesulphurisation, i.e., that it has the same efficacy for the two activities.

Further, the catalyst must have a good retention capacity for hydrodemetallisation. In contrast to hydrodesulphurisation where the reaction products remain in the reaction medium, the products resulting from hydrodemetallisation remain absorbed on the catalyst. It is thus important that the catalyst can absorb as much as possible of the metallic derivatives from hydrodemetallisation as once saturated with metallic derivatives, it has to be replaced.

During catalytic hydrodemetallisation, metal elimination encounters a certain number of catalytic problems, in particular as regards the catalytic support.

A first problem arises from the fact that the metallic compounds are high molecular weight compounds, such as asphaltenes and resins, with a high degree of steric hindrance resulting in diffusional limitations in the catalyst's pore network.

A second problem arises since the metals, of more exactly the metal sulphides, from the decomposition of the metallic compounds accumulate during the operation, gradually reducing the pore diameter.

A third problem arises because the metallic compounds of the asphaltene type tend to dehydrogenate then to polycondense under the operating conditions to give rise to products which are insoluble in the hydrocarbon medium and to coke which remains fixed on the catalyst thus gradually reducing its activity.

A heavy cut hydrotreatment catalyst must thus be composed of a catalytic support with a porosity profile which is particularly adapted for the specific diffusional constraints encountered in hydrotreatment, in particular hydrodemetallisation.

The catalysts are normally composed of a support on which metallic oxides, such as cobalt, nickel or molybdenum oxides are deposited. The support is generally alumina-based, its role being to disperse the active phase and to provide a texture which is suitable for good capture of the metallic impurities, avoiding the problems defined above.

Prior art alumina-based supports fall into two categories.

The first category consists of alumina extrudates prepared from alumina gel. Such alumina gel extrudates represent the majority of catalyst supports for hydrotreatment, but they suffer from a number of disadvantages.

Firstly, their porosity is particularly adapted for hydrodesulphurising and hydrotreating light hydrocarbon-containing cuts, but not for other types of treatment.

Then, although such extrudates are equilibrated as regards their hydrodemetallisation/hydrodesulphurisation ratio, their hydrodemetallisation retention capacity is low, in general at most 30%, so they are rapidly saturated and have to be replaced.

Further, alumina gel is expensive, meaning that the supports which are produced are expensive.

Finally, the process for preparing the alumina gel is particularly polluting in contrast to that of the alumina produced by rapid dehydration of hydrargillite, known as flash alumina.

Alumina beads prepared from alumina from the rapid dehydration of hydrargillite are also used for hydrotreatment, at a lower cost. Such beads, however, suffer from a disadvantage: the bead diameter has to be more than 2 mm for a satisfactory cost price, meaning that the metals cannot be introduced to the core of the beads. The catalytic phase with which the bead core is impregnated is thus not used.

Smaller flash alumina extrudates would not have this disadvantage, but currently there is no preparation process which would produce such flash alumina extrudates with a porosity suitable for hydrotreatment.

One aim of the present invention is to provide cheap alumina-based supports for hydrotreatment.

Another aim of the present invention is to provide alumina extrudates produced by rapid dehydration of hydrargillite with characteristics which are adapted for their use as supports for hydrotreatment catalysts.

A still further aim of the present invention is to provide processes for preparing these alumina extrudates.

With these aims in mind, in a first aspect, the invention provides alumina extrudates produced by a preparation process starting from an alumina produced by the rapid dehydration of hydrargillite with a total pore volume of at least 0.6 cm$^3$/g, an average mesoporous diameter in the range 140 to 360 Å, and an alumina content produced by boehmite decomposition in the range 5% to 70% by weight.

The invention also concerns a first process for forming an alumina from a starting alumina produced by the rapid dehydration of hydrargillite, comprising the following steps:

$a_1$ starting with an alumina produced by rapid dehydration of hydrargillite;

$b_1$ rehydrating the starting alumina;

$c_1$ mixing the rehydrated alumina in the presence of an emulsion of at least one hydrocarbon in water;

$d_1$ extruding the alumina-based paste obtained from step $c_1$;

$e_1$ drying and calcining the extrudates;

$f_1$ carrying out a hydrothermal acid treatment in a confined atmosphere on the extrudates from step $e_1$;

$g_1$ optionally drying, then calcining the extrudates from step $f_1$.

The invention also concerns a second process for forming an alumina from a starting alumina produced by the rapid dehydration of hydrargillite, comprising the following steps:

$a_2$ starting from a starting alumina produced by rapid dehydration of hydrargillite;

$b_2$ forming the alumina into beads in the presence of a pore-forming agent;

$c_2$ ageing the alumina beads obtained;

d₂ mixing the beads from step c₂ to obtain a paste which is extruded;

e₂ drying and calcining the extrudates obtained;

f₂ carrying out a hydrothermal acid treatment in a confined atmosphere on the extrudates obtained from step e₂;

g₂ optionally drying, then calcining the extrudates from step f₂.

The invention also concerns a third process for forming an alumina from a starting alumina produced by the rapid dehydration of hydrargillite, comprising the following steps:

a₃ starting from an alumina produced by rapid dehydration of hydrargillite;

b₃ rehydrating the starting alumina;

c₃ mixing the rehydrated alumina with a pseudo-boehmite gel, the gel being present in an amount in the range 1% to 30% by weight with respect to the rehydrated alumina and the gel;

d₃ extruding the alumina-based paste obtained from step c₃;

e₃ drying and calcining the extrudates obtained;

f₃ carrying out a hydrothermal acid treatment in a confined atmosphere on the extrudates obtained from step e₃;

g₃ optionally drying, then calcining the extrudates from step f₃.

Finally, the invention concerns the use of this alumina as a catalyst or catalyst support.

Figure 2:
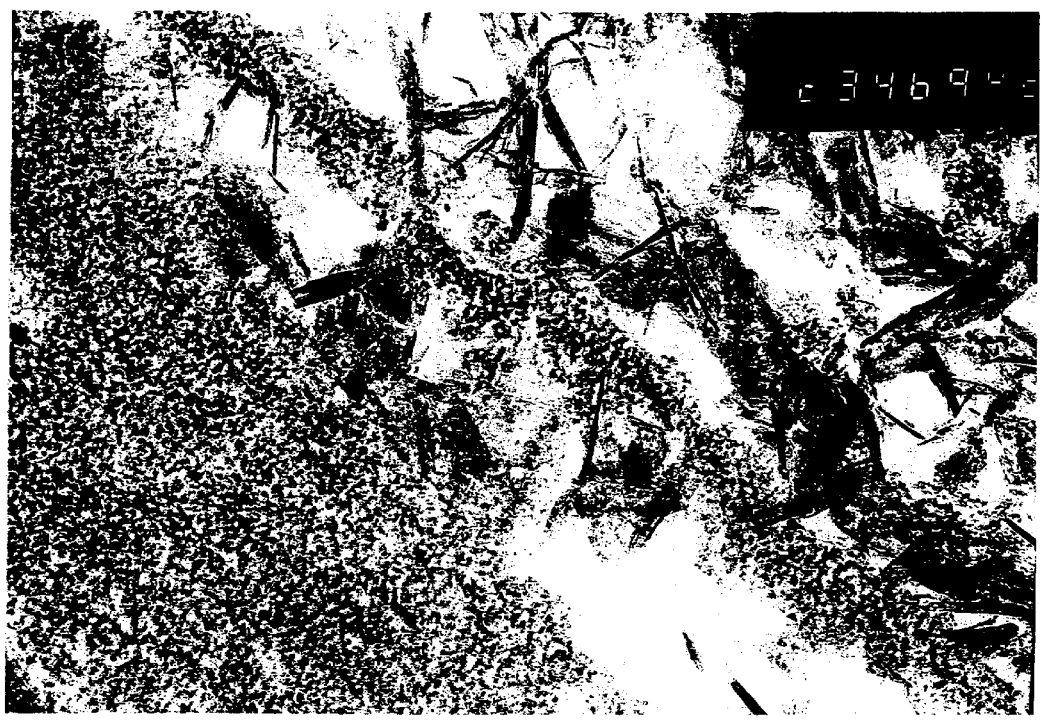

FIGS. 1 and 2 are photographs of sections of an extrudate of the invention produced by transmission electron microscopy.

In hydrotreatment, the extrudates of the invention have the advantage of being equilibrated in hydrodemetallisation and hydrodesulphurisation and of having a good retention capacity for hydrodemetallisation.

Other advantages of the invention will become apparent from the following more detailed description.

Firstly, the invention concerns alumina extrudates produced by a preparation process starting from an alumina produced by the rapid dehydration of hydrargillite with a total pore volume of at least 0.6 cm³/g, an average mesoporous diameter in the range 140 to 360 Å, and an alumina content produced by boehmite decomposition in the range 5% to 70% by weight.

The term "produced by boehmite decomposition" means that during the extrudate preparation process, boehmite type alumina is developed to the point of representing 5% to 70% by weight of the total alumina, then is decomposed. This amount of alumina produced by boehmite decomposition is measured by X ray diffraction before decomposition of said boehmite.

The alumina extrudates of the invention generally and preferably have a total pore volume (TPV) of at least 0.6 cm³/g, preferably at least 0.65 cm³/g.

The TPV is measured as follows: the grain density and absolute density are determined: the grain densities (Dg) and absolute densities (Da) are measured using a mercury and a helium picnometry method respectively, then the TPV is given by the formula:

$$TPV = \frac{1}{D_g} - \frac{1}{D_a}$$

The average mesoporous diameter of the extrudates of the invention is also in the range 150 to 360 Å. The average mesoporous diameter for the given extrudates is measured using a graph of the pore distribution of said extrudates. It is the diameter for which the associated volume on the graph is:

$$V_{100\text{Å}} + \frac{V_{60\text{Å}} - V_{1000\text{Å}}}{2}$$

where $V_{1000\text{ Å}}$ represents the volume created by pores with a diameter of over 1000 Å, or the macroporous volume;

$V_{60\text{ Å}}$ represents the volume created by pores with a diameter of over 60 Å;

$V_{60\text{ Å}} - V_{1000\text{ Å}}$ represents the mesoporous volume, i.e., the volume created by pores with a diameter in the range 60 Å to 1000 Å, i.e., the volume created by all the pores with a size in the range 60 Å to 1000 Å.

These volumes are measured using the mercury penetration technique in which the Kelvin law is applied which defines a relationship between the pressure, the diameter of the smallest pore into which the diameter penetrates at that pressure, the wetting angle and the surface tension in the following formula:

$$\varnothing = (4t \cos \theta)/P$$

where $\varnothing$ represents the pore diameter;

t represents the surface tension;

θ represents the angle of contact; and

P represents the pressure.

The mesoporous volume ($V_{60\text{ Å}} - V_{1000\text{ Å}}$) of the extrudates of the invention is preferably at least 0.3 cm³/g, more preferably at least 0.5 cm³/g.

The macroporous volume ($V_{1000\text{ Å}}$) of the extrudates of the invention is preferably at most 0.5 cm³/g. In a variation, the macroporous volume ($V_{1000\text{ Å}}$) is at most 0.3 cm³/g, more preferably at most 0.1 cm³/g and still more preferably at most 0.08 cm³/g.

These extrudates normally have a microporous volume ($V_{0-60\text{ Å}}$) of at most 0.55 cm³/g, preferably at most 0.2 cm³/g. The microporous volume represents the volume created by pores with a diameter of less than 60 Å.

Such a pore distribution which minimises the proportion of pores of less than 60 Å and those of more than 1000 Å while increasing the proportion of mesopores (with a diameter in the range 60 Å to 1000 Å) is particularly adapted to the diffusional constraints of hydrotreating heavy hydrocarbon cuts.

In a variation, the pore distribution over the pore diameter range from 60 Å to 1000 Å (mesopores) is extremely narrow at around 140 Å, i.e., in this range the diameter of the majority of pores is preferably in the range 60 Å to 500 Å, more preferably in the range 80 Å to 200 Å.

The specific surface area (SSA) of the extrudates of the invention is generally at least 120 m²/g, preferably at least 150 m²/g. This surface area is a BET surface area. The term "BET surface area" means the specific surface area determined by nitrogen adsorption in accordance with the standard ASTM D 3663–78 established using the BRUNAUER-EMMETT-TELLER method described in "The Journal of the American Society" 60, 309 (1938).

Preferably, the diameter of the extrudates of the invention is in the range 0.3 to 10 mm, more preferably in the range 0.8 to 3.2 mm, and the length is in the range 1 mm to 20 mm, preferably in the range 1 to 10 mm.

The average crushing strength (ACS) of these extrudates is generally at least 0.7 kg/mm for 1.6 mm extrudates, preferably at least 1, and the crush strength (CS) is at least 1 MPa.

The method of measuring the average crushing strength (ACS) consists of measuring the type of maximum compression which an extrudate can support before it fails, when the product is placed between two planes being displaced at a constant speed of 5 cm/min.

Compression is applied perpendicular to one of the extrudate generatrices, and the average crushing strength is expressed as the ratio of the force to the length of the generatrix of the extrudate.

The method used to measure the crush strength (CS) consists of subjecting a certain quantity of extrudates to an increasing pressure over a sieve and recovering the fines resulting from crushing the extrudates. The crush strength corresponds to the force exerted to obtain fines representing 0.5% of the weight of the extrudates under test.

On the microscopic scale, the alumina of the invention is partially in the form of packs of flakes and partially in the form of needles, the needles being dispersed both around the packs of flakes and between the flakes.

In general, the length and breadth of the flakes varies between 1 and 5 $\mu$m with a thickness of the order of 10 nm. They can be packed in groups forming a thickness of the order of 0.1 to 0.5 $\mu$m, the groups possibly being separated from each other by a thickness of the order of 0.05 to 0.1 $\mu$m.

The needle length can be in the range 0.05 to 0.5 $\mu$m; their cross section is of the order of 10 to 20 nm. These dimensions are given by measuring the extrudates in electron microscope photographs. The needles between the flakes are generally smaller than the needles surrounding the flakes.

The alumina flakes principally comprise $\chi$ alumina and $\eta$ alumina and the needles are $\gamma$ alumina.

The flake structure is characteristic of the hydrargillite lineage of alumina, which means that before activation by calcining these extrudates have the same structure, the flakes being hydrargillite in nature. On calcining, this alumina in its hydrargillite form is principally transformed into dehydrated $\chi$ and $\eta$ aluminas In contrast, the needle structure is characteristic of a boehmite lineage, meaning that before activation by calcining, these extrudates have the same structure, this alumina being in the form of boehmite. Calcining transforms this boehmite alumina into dehydrated $\gamma$ alumina.

The extrudates of the invention are thus obtained by calcining, the extrudates being constituted by hydrargillite alumina-based flakes prior to calcining, the flakes being surrounded at their periphery by boehmite alumina-based needles, such needles also being found around the flakes.

The invention also concerns a first process for forming such an alumina from a starting alumina produced by rapid dehydration of hydrargillite, characterized in that it comprises the following steps:

$a_1$ starting with an alumina produced by rapid dehydration of hydrargillite;

$b_1$ rehydrating the starting alumina;

$c_1$ mixing the rehydrated alumina in the presence of an emulsion of at least one hydrocarbon in water;

$d_1$ extruding the alumina-based paste obtained from step $c_1$;

$e_1$ drying and calcining the extrudates;

$f_1$ carrying out a hydrothermal acid treatment in a confined atmosphere on the extrudates from step $e_1$;

$g_1$ optionally drying, then calcining the extrudates from step $f_1$.

The forming process of the invention is suitable for a specific starting alumina produced by rapid dehydration of Bayer hydrate (hydrargillite) which is an industrially available aluminium hydroxide and extremely cheap.

Such an alumina is in particular obtained by rapid dehydration of hydrargillite using a hot gas stream, the temperature of the gas entering the apparatus generally being between about 400° C. and 1200° C., the contact time between the alumina and the hot gases generally being in the range from a fraction of a second to 4–5 seconds; such a process for preparing an alumina powder has been described in French patent FR-A-1 108 011.

The alumina obtained can be used as it is or before undergoing step $b_1$, it can be treated to eliminate the alkalis present: a $Na_2O$ content of less than 0.5% by weight is preferable.

In step $b_1$, this starting alumina, which is in the form of a powder, is rehydrated. Rehydration transforms alumina to a rehydrated alumina which is partially in the form of a boehmite type alumina with a particular texture.

The starting alumina is preferably re-hydrated so that the boehmite type alumina content is at least 3% by weight, more preferably at most 40% by weight, in particular in the range 10% to 35%.

This rehydration can be carried out using any means known to the skilled person. Preferably, the starting alumina is rehydrated by suspending in water in the presence of an $Al^{3+}$ cation complexing agent.

This complexing agent can be selected from the group formed by:

acids comprising at least one carboxylate group and at least two hydroxyl and/or amine groups, or comprising at least two carboxylate groups and at least one hydroxyl and/or amine group, and salts thereof, organic phosphoric acids with the following formulae (I), (II) and (III):

9/15 where n and m are whole numbers in the range 1 to 6, p is a whole number in the range 0 to 5, R1, R2 and R3, which may be identical or different, represent a hydrogen atom, an aralkyl, aryl, alkyl group or a hydroxyl or amine group, hydroxyquinolines or derivatives with the following formula (IV):

9/36 where R represents a hydrogen atom, a hydrocarbon radical containing 1 to 20 carbon atoms or a halogen atom.

This complexing agent is preferably a carboxylic acid containing 2 to 15 carbon atoms. It can be selected from:

oxalic acid, hydroxypolycarboxylic acids, more particularly:

hydroxydi- or hydroxytri-carboxylic acids such as malic acid, citric acid or tartronic acid;

(polyhydroxy)monocarboxylic acids such as glucoheptonic acid and gluconic acid;

poly(hydroxycarboxylic) acids such as tartaric acid.

The salts of these acids are also suitable—, such as alkali metal salts, in particular sodium salts, and ammonium salts.

Regarding the complexing agents with formulae (I) to (III), an organic, preferably substituted or non substituted aliphatic phosphoric acid is used. This contains 1 to 15 carbon atoms, preferably 1 to 10.

Examples of such compounds which can be cited are:

methylene aminotrophosphonate, methylene ethylenediaminotetraphosphate, methylene triethylenetetraaminohexaphosphonate, methylene tetraethylenepentaaminoheptaphosphonate, methylene pentaethylenehexaaminooctaphosphonate;

methylene, 1,1'-ethylene, 1,2-ethylene; 1,1'-propylene, 1,3-propylene, 1,6-hexa methylene diphosphonate; 2,4-dihydroxypentamethylene-2,4-diphosphonate, 2,5-dihydroxyhexamethylene-2,5-diphosphonate; 2,3-dihydroxybutylene-2,3-diphosphonate; 1-hydroxybenzyl-1,1'-diphosphonate; 1-aminoethylene- 1,1'-diphosphonate; hydroxymethylene diphosphonate; 1-hydroxyethylene-1,1'-diphosphonate; 1-hydroxypropylene-1,1'-diphosphonate; 1-hydroxybutylene-1,1'-diphosphonate; 1-hydroxyhexamethylene-1,1'-diphosphonate.

Regarding the complexing agents with formula (IV), a compound with formula (IV) is preferably used wherein R is a hydrogen atom or a linear or branched, saturated or unsaturated aliphatic group preferably containing 5 to 20 carbon atoms.

Preferably, an oxine (hydroxy-8-quinoline) is used or a hydroxy-8-quinoline with formula (IV) where R is always a hydrogen atom, with the exception of the 7 position on the ring where it represents an alkyl group with formula $C_mH_{2m+1}$ where m is in the range 5 to 20.

The complexing agent defined is used in the solid form or preferably in the form of an aqueous solution with a concentration which preferably is in the range 0.01 to 1 mole/liter.

The quantity of complexing agent introduced with respect to the quantity of alumina is determined such that it preferably represents 0.01% to 5% by weight of the alumina, more preferably 0.05% to 1%.

The preferred complexing agent is citric acid. It can be used in an amount in the range 0.1% to 1% by weight with respect to the alumina.

The suspension of alumina in the presence of the $Al^{3-}$ complexing agent is generally carried out at a concentration in the range 200 to 700 g/l of alumina in water, preferably 500 g/l.

The temperature during step $b_1$ can be between 50° C. and 100° C. for a period in the range from a few hours to 72 hours.

The suspended alumina is then filtered and a cake is recovered which can be washed with water.

In step $c_1$, the rehydrated alumina is then mixed in the presence of an emulsion of at least one hydrocarbon in water.

Optionally, between steps $b_1$ and $c_1$, the rehydrated alumina from step $b_1$ can be dried. This drying must be carried out under conditions allowing the water impregnating the rehydrated alumina to be eliminated but without eliminating the water bonded to the alumina, and therefore the drying temperature is at most 250° C. As an example, the cake can be dried at a temperature in the range 60° C. to 150° C. Preferably, the cake is dried so that the dried alumina powder has a loss on ignition, measured by calcining at 1000° C., in the range 20% to 40%.

During step $c_1$, the rehydrated alumina is mixed with an emulsion of at least one hydrocarbon in water. This emulsion is obtained by mixing the hydrocarbon and a surfactant in water.

This hydrocarbon can be selected from those containing 10 to 15 carbon atoms and a boiling point in the range 185° C. to 200° C. such as lamp oil, paraffin oil or any other alkane cut, and mixtures thereof.

The aqueous phase/hydrocarbon phase ratio of the emulsion can be at least 1.

The quantity of hydrocarbon, in emulsion in water, mixed with the rehydrated alumina is generally at least 5% by weight with respect to the weight of rehydrated alumina, preferably at least 10% and at most 50%.

In a preferred implementation of the process of the invention, the petroleum-in-water emulsion comprises a non ionic surfactant.

In a particularly preferred mode, it is a non ionic surfactant with ethylene oxide (EO)-propylene oxide (PO) double blocks, in particular those containing at least 10 PO motifs.

The surfactant is preferably selected from those for which the hydrocarbon-in-water emulsion is stable in an acidic medium. To verify this property, an emulsion as defined above is prepared by mixing and stirring water, a hydrocarbon and the surfactant to be tested, then adding an acid. If the three phases: water/surfactant/hydrocarbon are observed to settle out by separating, the emulsion is not stable in an acidic medium.

To this end, the following commercially available surfactants can be used: Galoryl EM 10® from the Compagnie Francaise des Produits Industriels, and Soprophor SC138® sold by Rhône-Poulenc Geronazzo.

In general, the amount of surfactant in the emulsion is at least 3% by weight with respect to the hydrocarbon, preferably in the range 5% to 15%.

The emulsion is generally prepared by bringing the different constituents (water, hydrocarbons, surfactants) into contact then stirring.

In a preferred implementation of the invention, the rehydrated alumina and the emulsion are mixed in an acidic medium, in particular in the presence of nitric acid. The acid can be introduced via the emulsion.

Mixing can be carried out using any mode known to the skilled person, in particular using a Z blade mixer or a twin screw mixer.

Water can be added to adjust the viscosity of the paste to be extruded.

When mixing is carried out in an acidic medium, the alumina-based paste is preferably neutralised between steps $c_1$ and $b_1$. This neutralisation can be carried out using an ammonia type base. The neutralising agent is normally introduced when mixing is complete.

During step $d_1$, the paste from the mixing step is extruded through a die, for example using a piston or a twin extrusion screw. This extrusion step can be carried out using any method which is known to the skilled person.

In step $e_1$, after forming, the alumina extrudates are dried and calcined. The drying temperature can be in the range 100° C. to 200° C., and the calcining temperature in the range 200° C. to 700° C.

The extrudates from step $e_1$ then undergo acid hydrothermal treatment in a confined atmosphere (step $f_1$).

The term "hydrothermal treatment in a confined atmosphere" means treatment by passage through an autoclave in the presence of water at a temperature higher than ambient temperature.

During this hydrothermal treatment, the formed alumina can be treated in different ways. Thus the alumina can be impregnated with acid prior to its passage through the autoclave, alumina autoclaving being carried out either in the vapour phase or in the liquid phase; this vapour or liquid phase of the autoclave may or may not be acidic. This impregnation prior to autoclaving can be carried out dry or by immersing the alumina in an aqueous acidic solution. The term "dry impregnation" means bringing the alumina into contact with a volume of solution which is less than or equal to the total pore volume of the treated alumina. Impregnation is preferably dry impregnation.

It is also possible to treat the agglomerates without prior impregnation with an acid, the acidity in this case being provided by the aqueous liquid of the autoclave.

The hydrothermal treatment is normally carried out in the presence of an aqueous acidic solution constituted by a mixture of at least one acid which can dissolve at least a portion of the alumina of the extrudates and at least one compound which provides an anion which can combine with the aluminium ions in solution. The term "acid which can dissolve at least a portion of the alumina of the extrudates" means any acid which, brought into contact with the alumina extrudates, dissolves at least a portion of the aluminium ions. The acid preferably dissolves at least 0.5% by weight of the alumina of the alumina extrudates.

This acid is preferably selected from strong acids such as: nitric acid, hydrochloric acid, perchloric acid, sulphuric acid, or a weak acid used at a concentration such that the pH of the aqueous solution is less than 4, such as acetic acid, or a mixture of these acids.

The term "compound providing an anion which can combine with the aluminium ions in solution" means any compound which can liberate an anion $A^{-n}$ in solution which can form, with the $Al^{3+}$ cations, products in which the atomic ratio $nA/Al \geq 3$.

A particular case of these salts can be illustrated by basic salts with general formula $Al_2(OH)_xA_y$, in which $0<x<6$; n $y<6$; n represents the number of charges on anion A. Compounds which can liberate anions in solution can preferably liberate anions selected from the group formed by nitrate, chloride, sulphate, perchlorate, chloroacetate, dichloroacetate, trichloroacetate, bromoacetate, dibromoacetate and anions with general formula:

13/31 where R represents a radical selected from the group formed by H, $CH_3$, $C_2H_5$, $CH_3CH_2CH_2$, $(CH_3)_2CH$. The anions can be liberated in solution as the anion $A^{-n}$, either directly by dissociation, or indirectly, for example by hydrolysis. The compounds can in particular be selected from groups comprising: mineral or organic acids, anhydrides, organic or mineral salts, and esters. The salts include alkaline or alkaline-earth salts which are soluble in aqueous media, such as sodium, potassium, magnesium or calcium salts, ammonium salts, aluminium salts, or rare earth salts.

In a preferred mode, the hydrothermal treatment is carried out in the presence of a mixture of nitric acid and acetic acid. The respective quantities of these two acids are generally in the range 3% to 15% by weight.

The autoclave is preferably a rotating basket autoclave such as that defined in European patent application EP-A-0 387 109.

The temperature during autoclaving can be in the range 150° C. to 250° C. for a period in the range 30 minutes to 3 hours.

The treatment can be carried out under saturation vapour pressure or under a partial pressure of water vapour of at least 70% of the pressure of the saturation vapour pressure corresponding to the treatment temperature.

This hydrothermal treatment in a confined atmosphere leads to transformation of at least a portion of the alumina into the boehmite form.

The hydrothermal treatment must be carried out such that at the end of step $f_1$, the alumina has a boehmite type alumina content of at most 70% by weight, preferably at least 5% by weight. The skilled person will know how to adjust the autoclave parameters to obtain such contents.

After the hydrothermal treatment step $f_1$, the extrudates are optionally dried, then calcined (step $g_1$). The drying temperature can be in the range 100° C. to 200° C. and the calcining temperature is in the range 200° C. to 700° C.

The invention also concerns a second process for forming an alumina as described above, from a starting alumina produced by the rapid dehydration of hydrargillite as described above, characterized in that it comprises the following steps:

$a_2$ starting from a starting alumina produced by rapid dehydration of hydrargillite;

$b_2$ forming the alumina into beads in the presence of a pore-forming agent;

$c_2$ ageing the alumina beads obtained;

$d_2$ mixing the beads from step $c_2$ to obtain a paste which is extruded;

$e_2$ drying and calcining the extrudates obtained;

$f_2$ carrying out a hydrothermal acid treatment in a confined atmosphere on the extrudates obtained from step $e_2$;

$g_2$ optionally drying, then calcining the extrudates from step $f_2$.

This second forming process of the invention is also suitable for a specific starting alumina produced by the rapid dehydration of Bayer hydrate.

During step $b_2$, the alumina is formed into beads.

This forming step can be carried out using any technique which is known to the skilled person. It is carried out directly on the alumina powder using a rotary technique. The term "rotary technique" means any apparatus in which agglomeration is carried out by contact and rotating the product to be granulated on itself. Apparatus of this type which can be cited include the rotary bowl granulator and the rotating drum.

This forming is carried out in the presence of a pore-forming agent. Examples of pore-forming compounds which can be cited include wood flour, wood charcoal, sulphur, tars, plastics materials or emulsions of plastic materials such as polyvinyl chloride, polyvinyl alcohols, naphthalene or the like, and in general any organic compound which can be eliminated by calcining. The quantity of pore-forming compounds added is not critical, nor is their size. In general, the quantity of pore-forming agents is in the range 5% to 30% by weight with respect to the alumina.

The size of the beads obtained is not critical. In general it is in the range 1 to 5 mm.

The beads from step $b_2$ then undergo ageing (step $c_2$). Ageing can be carried out by maintaining the alumina beads in an atmosphere with a controlled humidity. The temperature can be in the range 30° C. to 100° C., preferably in the range 80° C. to 100° C. The ageing period can be from a few hours to a few tens of hours, preferably in the range 6 to 24 hours.

During this ageing step, the alumina rehydrates to boehmite ($Al_2O_3,H_2O$) and bayerite ($Al_2O_3,3H_2O$).

The ageing conditions must be selected to allow the crystalline boehmite phase of the alumina to develop. At the end of step $c_2$, the amount of boehmite type alumina is preferably in the range 5% to 40%, more preferably 20% to 30% with respect to the weight of alumina.

One practical ageing mode consists of injecting live steam onto the alumina beads.

During step $d_2$, the aged alumina beads are mixed in the presence of water and acid so as to break them up and obtain an extrudable homogeneous paste. The acid used can be a strong acid (for example nitric acid) or acetic acid, formic acid, etc.

The quantity of acid with respect to the alumina is generally in the range 0.5% to 15% by weight.

Mixing can be carried out using any method known to the skilled person, in particular using a Z blade mixer or a twin screw mixer.

This paste is then extruded through a die, for example using a piston or a continuous twin screw or single screw extruder. This extrusion step can be carried out using any method which is known to the skilled person. The viscosity of the paste to be extruded is adjusted by the quantity of water added during mixing.

Then in a step $e_2$, after extrusion, the extrudates are dried and calcined. As above, the drying temperature can be in the range 100° C. to 200° C., the calcining temperature is in the range 200° C. to 800° C.

The extrudates from step $e_2$ then undergo acid hydrothermal treatment in a confined atmosphere (step $f_2$). The hydrotreatment conditions are identical to those defined for the first preparation process described above.

After the hydrothermal treatment step $f_2$, the extrudates are optionally dried, then calcined (step $g_2$). As was the case for the first process, the drying temperature can be in the range 100° C. to 200° C., and the calcining temperature in the range 200° C. to 700° C.

The invention also concerns a third process for forming an alumina as described above from a starting alumina produced by the rapid dehydration of hydrargillite as described above, characterized in that it comprises the following steps:

$a_3$ starting from an alumina produced by rapid dehydration of hydrargillite;

$b_3$ rehydrating the starting alumina;

$c_3$ mixing the rehydrated alumina with a pseudo-boehmite gel, the gel being present in an amount in the range 1% to 30% by weight with respect to the rehydrated alumina and the gel;

$d_3$ extruding the alumina-based paste obtained from step $c_3$;

$e_3$ drying and calcining the extrudates obtained;

$f_3$ carrying out a hydrothermal acid treatment in a confined atmosphere on the extrudates obtained from step $e_3$;

$g_3$ optionally drying, then calcining the extrudates from step $f_3$.

This process uses steps identical to steps $a_1$, $b_1$, $d_1$, $e_1$, $f_1$ and $g_1$ of the first process described above.

However, in step $c_3$, the rehydrated alumina from step $b_3$ is not mixed with a hydrocarbon emulsion but with a pseudo-boehmite gel in an amount in the range 1% to 30% by weight with respect to the rehydrated alumina and to the gel, preferably in the range 5% to 20% by weight.

Such a pseudo-boehmite gel can be obtained by precipitating aluminium salts such as aluminium chloride, aluminium sulphate, aluminium nitrate, aluminium acetate with a base or by hydrolysis of aluminium alkoxides such as aluminium triethoxide.

Mixing can be carried out by any method which is known to the skilled person, in particular using a Z blade mixer or a twin screw mixer.

Water can be used to adjust the viscosity of the paste to be extruded.

Finally, the invention concerns the use of the alumina extrudates described above or from the above processes as catalysts, catalyst supports or adsorbents.

The right hand side of FIG. 1 shows a pack of flakes surrounded by needles. This pack is surrounded by needles on its left hand side. Needles can also be seen inside the pack of flakes. The scale of the photograph is such that 1 cm on the photo represents 263 nm.

FIG. 2 shows a flake separated from the other flakes by needles. The scale of the photograph is such that 1 cm on the photo represents 79 nm.

The following examples illustrate the invention without in any way limiting its scope.

EXAMPLES

Example 1 to 3

Preparation of Alumina-based Supports According to the First Process of the Invention Step $a_1$—starting alumina: The starting material was alumina obtained by very rapid decomposition of hydrargillite in a hot air stream (T=1000° C.). The product obtained was constituted by a mixture of transition aluminas: κ (khi) and ρ (rho) aluminas. The specific surface area was 300 m²/g and the loss on ignition (LOI) was 5%.

Step $b_1$—rehydration: The alumina was rehydrated by taking it into suspension in water at a concentration of 500 g/l at a temperature of 90° C. for a period of 48 h in the presence of 0.5% citric acid.

After filtering the suspension, a cake of alumina was recovered which was washed with water then dried at a temperature of 140° C. for 24 h.

The alumina obtained was in the form of a powder, its loss on ignition (LOI), measured by calcining at 1000° C., and its boehmite alumina content, measured by X ray diffraction, are shown in Table 1.

Step $c_1$—mixing: 10 kg of rehydrated and dried powder was introduced into a 25 l volume Z blade mixer and an emulsion of hydrocarbon in water stabilised by a surfactant, obtained using a stirred reactor, and 69% nitric acid, was gradually added. The characteristics are shown in Table 1.

Mixing was maintained until a consistent homogeneous paste was obtained. After mixing, a 20% ammonia solution was added to neutralise the excess nitric acid, continuing mixing for 3 to 5 min.

Step $d_1$—extrusion: The paste obtained was introduced into a single screw extruder to obtain raw extrudates with a diameter of 1.6 mm.

Step $e_1$—drying/calcining: The extrudates were then dried at 140° C. for 15 h and calcined for 12 h at the temperature shown in Table 1. The calcined support had a specific surface area of between 200 m²/g and 130 m²/g as shown in Table 1.

Step $f_1$—hydrothermal treatment: The extrudates obtained were impregnated with a solution of nitric and acetic acid in the following concentrations: 3.5% of nitric acid with respect to the weight of alumina and 6.5% of acetic acid with respect to the weight of alumina. They then underwent hydrothermal treatment in a rotating basket autoclave under the conditions defined in Table 1.

Step $g_1$—drying/calcining: At the end of this treatment, the extrudates were calcined at a temperature of 550° C. for 2 h.

The characteristics of the extrudates obtained are shown in Table 1.

The boehmite content shown in Table 1 was measured for the extrudates prior to final calcining.

TABLE 1

| | Example 1 | Example 2 | Example 3 |
|---|---|---|---|
| Rehydrated alumina-end of step b1 | | | |
| % boehmite | 24 | 31 | 33 |
| LOI (1000° C.) | 25 | 25 | 25 |

TABLE 1-continued

|  | Example 1 | Example 2 | Example 3 |
|---|---|---|---|
| Mixing-step c1 | | | |
| Hydrocarbon type | petroleum | petroleum | petroleum |
| % HNO3/Al2O3* | 10 | 7 | 10 |
| % hydrocarbon/Al2O3* | 15 | 15 | 5 |
| water/hydrocarbon | 3.7 | 3.7 | 3.7 |
| Surfactant type | Galoryl EM 10 ® | Soprophor SC138 ® | Galoryl EM 10 ® |
| % surfactant/hydrocarbon | 17 | 5 | 150 |
| Time (h) | 2.15 | 2 | 2.15 |
| % neutralisation with respect to HNO3, equivalents | 65 | 65 | 65 |
| Drying/calcining-step e1 | | | |
| Calcining temperature (° C.) | 680 | 600 | 600 |
| Specific surface area ($m^2/g$) | 148 | 174 | 182 |
| Hydrothermal treatment-step f1 | | | |
| Temperature (° C.) | 212 | 212 | 212 |
| Pressure (bar) | 19 | 19 | 19 |
| Time (h) | 2 | 2 | 2 |
| % boehmite | 40 | 62 | 45 |
| Characteristics of calcined extrudates obtained | | | |
| TPV ($cm^3/g$) | 0.80 | 0.85 | 0.86 |
| $V_{60}-V_{1000 Å}$ ($cm^3/g$) | 0.60 | 0.59 | 0.62 |
| $V_{1000 Å}$ ($cm^3/g$) | 0.19 | 0.22 | 0.28 |
| Av. mesopore diameter (Å) | 280 | 250 | 230 |
| $V_{0-60 Å}$ ($cm^3/g$) | 0.02 | 0.03 | 0.01 |
| Specific surface area ($m^2/g$) | 140 | 138 | 147 |
| ACS (daN/mm) | 1.2 | 1.0 | 0.9 |
| CS (MPa) | 1.58 | 1.30 | 1.2 |

*percentages given with respect to dehydrated alumina.

Examples 4 to 6

Preparation of Alumina-based Catalyst Supports Using the First Process of the Invention The same steps as described in Example 1 were used except that mixing step $c_1$ was carried out as follows.

Step $c_1$—mixing: This was a continuous process in a co-rotating twin screw mixer. Upstream of the mixer, the rehydrated and dried powder was introduced at a rate of 90 kg/h. A petroleum-in-water emulsion was prepared in a stirred reactor by introducing:

5.46 kg of water;

10.04 kg of 69% nitric acid;

10.4 kg of petroleum;

1.56 kg of Soprophor SC138.

This emulsion was introduced in an amount of 27.46 kg/h into the primer of the twin screw machine immediately following introduction of the alumina powder.

After machining, a 28% ammonia solution was introduced in an amount of 4.34 kg/h.

The passage time for the powder in the machine was of the order of 50 to 60 s.

A homogeneous paste which could be extruded was obtained from the machine outlet.

TABLE 1

|  | Example 4 | Example 5 | Example 6 |
|---|---|---|---|
| Rehydrated alumina-end of step b1 | | | |
| % boehmite | 33 | 33 | 33 |
| LOI (1000° C.) | 23 | 23 | 23 |
| Mixing-step c1 | | | |
| Hydrocarbon type | petroleum | petroleum | petroleum |
| % HNO3/Al2O3* | 10 | 10 | 10 |
| % hydrocarbon/Al2O3* | 15 | 15 | 15 |
| water/hydrocarbon | 2.6 | 2.6 | 2.6 |
| Surfactant type | Soprophor SC138 ® | Soprophor SC138 ® | Soprophor SC138 ® |
| % surfactant/hydrocarbon | 15 | 15 | 15 |
| % neutralisation with respect to HNO3, equivalents | 65 | 65 | 65 |
| Drying/calcining-step e1 | | | |
| Calcining temperature (° C.) | 600 | 600 | 600 |
| Specific surface area ($m^2/g$) | 177 | 177 | 177 |
| Hydrothermal treatment-step f1 | | | |
| Temperature (° C.) | 190 | 202 | 178 |
| Pressure (bar) | 13 | 16 | 10 |
| Time (h) | 2 | 2 | 2 |
| % boehmite | 21 | 43 | 9 |
| Characteristics of calcined extrudates obtained | | | |
| TPV ($cm^3/g$) | 0.66 | 0.66 | 0.64 |
| $V_{60}-V_{1000 Å}$ ($cm^3/g$) | 0.64 | 0.66 | 0.50 |
| $V_{1000 Å}$ ($cm^3/g$) | <0.02 | <0.02 | <0.02 |
| Av.mesopore diameter (Å) | 185 | 245 | 160 |
| $V_{0-60 Å}$ ($cm^3/g$) | 0.02 | 0.01 | 0.14 |
| Specific surface area ($m^2/g$) | 172 | 152 | 174 |
| ACS (daN/mm) | 0.8 | 1.1 | 0.7 |
| CS (MPa) | 1.14 | 1.58 | 1.45 |

*percentages given with respect to dehydrated alumina.

Examples 7 to 11

Preparation of Alumina-based Catalyst Supports Using the Second Process of the Invention Step $a_2$—starting alumina: The alumina of Example 1 was used.

Step $b_2$—bead formation: The alumina was mixed with wood dust as a pore-forming agent (20% by weight with respect to the alumina), then formed in a rotating bowl granulator. Water was added to aid forming. The diameter of the alumina beads obtained was in the range 1.5 to 4 mm.

Step $c_2$—ageing of beads: These beads were aged by passing steam, the bead temperature being 90° C. for 20 h. The loss on ignition of the beads obtained was 47.5% and they contained 25% by weight of boehmite.

Step $d_2$—mixing/extrusion: The mixing process used was a continuous process carried out in a corotating twin screw mixer.

Upstream of the mixer, alumina beads were introduced at a rate of 90 kg/h.

A solution of 2.42% nitric acid was introduced into the primer immediately following introduction of the aged beads, at a rate of 10.9 kg/h.

After machining, a 2.1% ammonia solution was introduced at a rate of 4.2%.

The passage time in the machine was of the order of 50 s.

A homogeneous alumina powder which could be extruded was obtained from the mixer outlet.

The paste obtained was extruded through a die with 1.6 mm diameter orifices.

Step e$_2$—drying/calcining: The extrudates were then dried at 140° C. for 2 h and calcined for 2 h at the calcining temperature shown in Table 3. The specific surface area of the calcined extrudates was between 120 and 200 m$^2$/g.

Step f$_2$—hydrothermal treatment: The extrudates obtained were impregnated with a solution of nitric and acetic acid in the following concentrations: 3.5% of nitric acid with respect to the weight of alumina and 6.5% of acetic acid with respect to the weight of alumina. They then underwent hydrothermal treatment in a rotating basket autoclave under the conditions defined in Table 3.

Step g$_2$—drying/calcining: At the end of this treatment, the extrudates were calcined at a temperature of 550° C. for 2 h.

The characteristics of the extruded alumina support C obtained are shown in Table 3.

The boehmite content was measured for the extrudates prior to final calcining.

TABLE 3

| | Example 7 | Example 8 | Example 9 | Example 10 | Example 11 |
|---|---|---|---|---|---|
| Drying/calcining-step e2 | | | | | |
| Calcining temperature (° C.) | 650 | 700 | 750 | 650 | 550 |
| Specific surface area (m$^2$/g) | 167 | 140 | 130 | 164 | 202 |
| Hydrothermal treatment-step f2 | | | | | |
| Temperature (° C.) | 214 | 204 | 220 | 178 | 178 |
| Pressure (bar) | 16.5 | 16 | 22 | 10 | 10 |
| Time (h) | 2 | 2 | 2 | 2 | 2 |
| % boehmite | 43 | 30 | 69 | 8 | 18 |
| Characteristics of calcined extrudates obtained | | | | | |
| TPV (cm$^3$/g) | 0.79 | 0.81 | 0.83 | 0.73 | 0.72 |
| V$_{60}$–V$_{1000 Å}$ (cm$^3$/g) | 0.65 | 0.66 | 0.60 | 0.54 | 0.54 |
| V$_{1000 Å}$ (cm$^3$/g) | 0.14 | 0.15 | 0.18 | 0.13 | 0.09 |
| Av. mesopore diameter (Å) | 240 | 250 | 360 | 160 | 170 |
| V$_{0-60 Å}$ (cm$^3$/g) | 0 | 0 | 0 | 0.06 | 0.09 |
| SSA (m$^2$/g) | 151 | 141 | 121 | 161 | 184 |
| ACS (daN/mm) | 0.90 | 0.90 | 0.8 | 1.1 | 1.5 |
| CS (MPa) | 1.37 | 1.24 | 1.43 | 1.37 | 1.0 |

Example 12

Catalytic Tests

Preparation of Catalysts

Catalysts A

The extrudates of Example 1 were dry impregnated with an aqueous solution containing molybdenum and nickel salts. The nickel salt was nickel nitrate Ni(NO$_3$)$_2$.6H$_2$O and the molybdenum salt was ammonium heptamolybdate Mo$_7$O$_{24}$(NH$_4$)$_6$.4H$_2$O.

After ageing at room temperature in a water-saturated atmosphere, the impregnated extrudates were dried overnight at 120° C. then calcined at 550° C. for 2 hours in air. The final MoO$_3$ content was 6.5% by weight and that of NiO was 1.4% by weight.

Catalysts B

The extrudates of Example 5 were dry impregnated with an aqueous solution containing molybdenum and nickel salts. The nickel salt was nickel nitrate Ni(NO$_3$)$_2$.6H$_2$O and the molybdenum salt was ammonium heptamolybdate Mo$_7$O$_{24}$(NH$_4$)$_6$.4H$_2$O.

After ageing at room temperature in a water-saturated atmosphere, the impregnated extrudates were dried overnight at 120° C. then calcined at 550° C. for 2 hours in air. The final MoO$_3$ content was 12.5% by weight and that of NiO was 3.0% by weight.

Catalysts C

The extrudates of Example 8 were dry impregnated with an aqueous solution containing molybdenum and nickel salts. The nickel salt was nickel nitrate Ni(NO$_3$)$_2$.6H$_2$O and the molybdenum salt was ammonium heptamolybdate Mo$_7$O$_{24}$(NH$_4$)$_6$.4H$_2$O.

After ageing at room temperature in a water-saturated atmosphere, the impregnated extrudates were dried overnight at 120° C. then calcined at 550° C. for 2 hours in air. The final MoO$_3$ content was 11.8% by weight and that of NiO was 2.5% by weight.

Comparative catalysts D

Alumina beads were prepared from the starting alumina of Example 1. The alumina was ground with a ball mill to obtain a powder with an average particle diameter of 7 μm.

This alumina was mixed with wood flour as a pore-forming agent (15% by weight), then formed in a rotating bowl granulator. Water was added to enable forming to be carried out.

The beads obtained were dried and calcined.

These beads then underwent an ageing step by passing steam at 100° C. for 24 hours.

They were immersed in an acetic acid solution at 50 g/l for about 5 hours. They were then withdrawn, drained and introduced into an autoclave for 2 hours at a temperature of 210° C. at a pressure of 20.5 bars.

At the autoclave outlet, the beads were dried for 4 hours at 100° C. then calcined for 2 hours at 650° C.

Beads with a grain size in the range 1.2 to 2.8 mm were selected.

The beads were dry impregnated with an aqueous solution containing nickel and molybdenum salts. The nickel salt was nickel nitrate Ni(NO$_3$)$_2$.6H$_2$O and the molybdenum salt was ammonium heptamolybdate Mo$_7$O$_{24}$(NH$_4$)$_6$.4H$_2$O.

After ageing at room temperature in a water-saturated atmosphere, the impregnated extrudates were dried overnight at 120° C. then calcined at 550° C. for 2 hours in air. The final MoO$_3$ content was 11.0% by weight and that of NiO was 2.6% by weight.

The characteristics of catalysts D were as follows:

| | |
|---|---|
| TPV: | 0.97 cm$^3$/g |
| V60–1000 Å: | 0.66 cm$^3$/g |
| V1000 Å: | 0.31 cm$^3$/g |
| Average mesopore diameter: | 250 Å |
| V0–60 Å: | 0 cm$^3$/g |
| SSA: | 119 m$^2$/g |
| ESH: | 1.48 MPa |

Tests

The catalysts obtained underwent a hydrotreatment test for different petroleum residues. They were an atmospheric residue (AR) of Middle Eastern origin (Arabian Light) and an atmospheric residue from an extra heavy Venezuelan crude (Boscan). These two residues are characterized by high viscosities, high Conradson carbon numbers and high asphaltene contents. The Boscan AR also contained very high amounts of nickel and vanadium. The characteristics of these residues are shown in Table 4:

TABLE 4

|  | Units | Arabian Light AR S4658 | Boscan AR S3345 |
|---|---|---|---|
| Density 15/4 |  | 0.959 | 1.023 |
| Viscosity at 100° C. | m²/s | 25.6. 10⁻⁶ | 1380. 10⁻⁶ |
| Viscosity at 150° C. | m²/s | 7.66. 10⁻⁶ | 120. 10⁻⁶ |
| Molecular mass | g/mol | 460 | 730 |
| Sulphur content | % by wt | 3.3 | 5.5 |
| Nitrogen content | Ppm by wt | 2075 | 5800 |
| Nickel content | Ppm by wt | 9 | 125 |
| Vanadium content | Ppm by wt | 35 | 1290 |
| Iron content | Ppm by wt | 1 | 8 |
| Carbon content | % by wt | 84.7 | 83.40 |
| Hydrogen content | % by wt | 11.2 | 10.02 |
| Aromatic carbon content | % by wt | 26 | 29.0 |
| Conradson carbon | % by wt | 9.5 | 16.9 |
| C5 asphaltenes content | % by wt | 5.6 | 24.1 |
| C7 asphaltenes content | % by wt | 3.1 | 14.9 |
| SARA |  |  |  |
| Saturates | % by wt | 30.7 | 8.7 |
| Aromatics | % by wt | 47.5 | 35.0 |
| Resins | % by wt | 7.6 | 34.0 |
| Asphaltenes | % by wt | 3.0 | 14.6 |
| Simulated distillation |  |  |  |
| IP | ° C. | 229 | 224 |
| 5% | ° C. | 325 | 335 |
| 10% | ° C. | 358 | 402 |
| 20% | ° C. | 404 | 474 |
| 30% | ° C. | 436 | 523 |
| 40% | ° C. | 468 | 566 |
| 50% | ° C. | 503 |  |
| 60% | ° C. | 543 |  |
| 70% | ° C. | 590 |  |
| 80% | ° C. | 642 |  |

The test was carried out in a pilot hydrotreatment plant for petroleum residues comprising a fixed bed tube reactor. The reactor was filled with one liter of catalyst. The fluid flow (petroleum residue+hydrogen recycle) was an upflow in the reactor. This type of pilot unit represents the operation of an Institut Français du Pétrole HYVAHL unit reactor for fixed bed hydroconversion of residues.

After a sulphuration step by circulating a gas oil cut with added dimethyldisulphonate DMDS at a final temperature of 350° C. in the reactor, the unit was operated with the petroleum residues described above under the following operating conditions:

| Total pressure | 15 MPa |
|---|---|
| Temperature | 380° C. |
| Hourly space velocity of residue | 0.5 m³ feed/m³ of reactor/h⁻¹ |
| Hydrogen recycle | 1000 std l. H₂/l. feed |
| Cycle start temperature | 370° C. |

Arabian light AR was injected first. After a 250 hour stabilisation period, the hydrodesulphuration (HDS) and hydrodemetallization (HDM) performances were as follows

| Catalyst | HDS (% wt) | HDM (% wt) |
|---|---|---|
| A | 66 | 78 |
| B | 68 | 75 |
| C | 65 | 77 |
| D comparative | 60 | 75 |

The HDS ratio is defined as follows:

$$HDS(\text{wt }\%)=100\times[(\text{wt }\% \ S)_{feed}-(\text{wt }\% \ S)\text{test}]/(\text{wt }\% \ S)_{feed}$$

The HDM ratio is defined as follows:

$$HDM(\text{wt }\%)=100\times[(\text{ppm wt Ni+V})_{feed}-(\text{ppm wt Ni+V})\text{test}]/(\text{ppm wt Ni+V})_{feed}$$

The feed was then changed by moving to the Boscan AR. The test conditions aimed to maintain the HDM ratio constant at about 80% by weight throughout the cycle. To this end, catalyst deactivation was compensated for by a gradual increase in the reaction temperature. The test was stopped when the reaction temperature reached 420° C., a temperature considered to be representative of the temperature at the end of a cycle in an industrial residue hydroconversion unit.

The following table compares the quantities of nickel and vanadium from the Boscan AR deposited on the 8 catalysts and the HDS level at the middle of the cycle:

| Catalyst | Ni + V deposited (% of weight of fresh catalyst) | Mid cycle HDS (wt %) |
|---|---|---|
| A | 80 | 52 |
| B | 35 | 58 |
| C | 82 | 54 |
| D comparative | 80 | 50 |

It thus appears that the form of extrudates of the present invention can lead to HDS performances which are higher than those of comparative catalyst D while achieving identical performances both for HDM and for retention of nickel+vanadium metals. The higher HDS perfomances were observed both for the Arabian Light and the Boscan atmospheric residue.

What is claimed is:

1. Alumina extrudates, prepared by a process comprising: at least one hydration step or ageing step of an alumina prepared by the rapid dehydration of hydrargillite, to obtain an alumina comprising at least 3% weight of boehmite, subsequently at least one treatment step comprising the mixing of said alumina comprising boehmite, and the extrusion of the resulting paste, subsequently at least one treatment step of drying and calcining the extrudates, and an additional hydrothermal acid treatment step of the extrudates in a confined atmosphere, the resulting extrudates having a total pore volume of at least 0.6 cm³/g, an average mesoporous diameter in the range 140 to 360 Å, an alumina content from boehmite decomposition in the range 5% to 70% weight, a mesoporous volume, defined as $V_{60\text{ Å}}-V_{1000\text{ Å}}$, of at least 0.3 cm³/g, a macroporous volume of at most 0.5 cm³/g, a microporous volume, defined as $V_{0-60\text{ Å}}$, of at most 0.55 cm³/g, and a specific surface area of at least 120 m²/g, microscopically the extrudates being partly in the form of packs of flakes, and partly in the form of needles, said needles being dispersed both about the flakes and between the flakes.

2. Extrudates according to claim 1, having a mesoporous volume ($V_{60\ Å}-V_{1000\ Å}$) of at least 0.5 cm$^3$/g.

3. Extrudates according to claim 1, having a macroporous volume ($V_{1000\ Å}$) of at most 0.3 cm$^3$/g.

4. Extrudates according to claim 1, having a microporous volume ($V_{0-60\ Å}$) of at most 0 2 cm$^3$/g.

5. Extrudates according to claim 1, having a specific surface area of at least 150 m$^2$/g.

6. Extrudates according to claim 1, wherein the extrudates have a diameter of 0.3 to 10 mm and a length of 1 to 20 mm.

7. Extrudates according to claim 6, wherein said flakes comprise principally dehydrated χ and η aluminas transformed from hydrargillite and said needles being γ-alumina transformed from boehmite.

8. Extrudates according to claim 1 in the form of a catalyst support, a catalyst or an adsorbent.

9. Alumina extrudates according to claim 1, wherein the extrudates have a diameter of 0.8 to 3.2 mm and a length of 1 to 10 mm.

10. Extrudates according to claim 1, which comprise dehydrated χ and η aluminas transformed from hydrargillite and γ-alumina transformed from boehmite.

11. A process for preparing alumina extrudates, comprising the following steps:
 $a_1$ starting with an alumina produced by rapid dehydration of hydrargillite;
 $b_1$ rehydrating the starting alumina;
 $c_1$ mixing the rehydrated alumina in the presence of an emulsion of at least one hydrocarbon in water so as to obtain an alumina based paste;
 $d_1$ extruding the alumina-based paste obtained from step $c_1$;
 $e_1$ drying and calcining the extrudates;
 $f_1$ carrying out a hydrothermal acid treatment in a confined atmosphere on the extrudates from step $e_1$;
 $g_1$ optionally drying, then calcining the extrudates from step $f_1$.

12. A process according to claim 11, wherein during step $b_1$, the starting alumina is rehydrated so as to provide a boehmite alumina content of at least 3% by weight.

13. A process according to claim 12, wherein the boehmite alumina content is at most 40% by weight.

14. A process according to claim 11 wherein during step $b_1$, the starting alumina is rehydrated by suspending in water in the presence of citric acid.

15. A process according to claim 11, wherein the quantity of hydrocarbon in emulsion in water, mixed with rehydrated alumina, is at least 5% by weight with respect to the rehydrated alumina.

16. A process according to claim 11, wherein the emulsion has an aqueous phase/hydrocarbon phase weight ratio of at least 1.

17. A process according to claim 11 wherein the emulsion of petroleum-in-water comprises a non ionic surfactant selected from non ionic surfactants with ethylene oxide (EO)-propylene oxide (PO) double blocks.

18. A process according to claim 17, wherein the surfactant is derived from at least 10 propylene oxide units.

19. A process according to claim 17, further comprising selecting the surfactant so as to provide stability to the hydrocarbon-in-water emulsion in an acid medium.

20. A process according to claim 19, the alumina-based paste is neutralised between steps $c_1$ and $d_1$.

21. A process according to claim 17, wherein the amount of surfactant in the emulsion is at least 3% by weight with respect to the hydrocarbon.

22. A process according to claim 11, wherein the rehydrated alumina and the emulsion are mixed in the presence of nitric acid.

23. A process according to claim 11, wherein the hydrothermal treatment is carried out in the presence of a mixture of nitric acid and acetic acid.

24. A process according to claim 11, wherein the hydrothermal treatment is carried out such that at the end of step $f_1$ the boehmite alumina content is at most 70% by weight.

25. A process according to claim 24, wherein the boehmite alumina content is at least 5%.

26. A process as in claim 11, wherein after step $f_1$, the extrudates comprise hydrargillite and between 9 and 62% by weight boehmite.

27. A process as in claim 26, wherein after step $f_1$ the extrudates comprise between 9 and 45% by weight boehmite.

28. A process for preparing alumina extrudates, comprising the following steps:
 $a_2$ starting from a starting alumina produced by rapid dehydration of hydrargillite;
 $b_2$ forming the alumina into beads in the presence of a pore-forming agent;
 $c_2$ ageing the alumina beads obtained;
 $d_2$ mixing the beads from step $c_2$ to obtain a paste which is extruded;
 $e_2$ drying and calcining the extrudates obtained;
 $f_2$ carrying out a hydrothermal acid treatment in a confined atmosphere on the extrudates obtained from step $e_2$;
 $g_2$ optionally drying, then calcining the extrudates from step $f_2$.

29. A process according to claim 28, during step $c_2$, the alumina beads are aged by treatment in water vapour at a temperature in the range 30° C. to 100° C.

30. A process according to claim 28 wherein at the end of step $c_2$, the boehmite alumina content is in the range 5% to 40%, with respect to the weight of the alumina.

31. A process according to claim 30, wherein said boehmite content is 20 to 30%.

32. A process according to claim 28, wherein the hydrothermal treatment step $f_2$ is carried out in the presence of a mixture of nitric acid and acetic acid.

33. A process according to claim 28, wherein the hydrothermal treatment is carried out such that at the end of step $f_2$, the boehmite alumina content is at most 70% by weight.

34. A process according to claim 33, wherein said boehmite content is at least 5%.

35. A process as in claim 28, wherein after step $f_2$ the extrudates comprise hydrargillite and between 8 and 69% by weight boehmite.

36. A process as in claim 35, wherein after step $f_2$ the extrudates comprise hydrargillite between 8 and 43% by weight boehmite.

37. A process for preparing alumina extrudates, comprising the following steps:
 $a_3$ starting from an alumina produced by rapid dehydration of hydrargillite;
 $b_3$ rehydrating the starting alumina;
 $c_3$ mixing the rehydrated alumina with a pseudo-boehmite gel, the gel being present in an amount in the range 1% to 30% by weight with respect to the rehydrated alumina and the gel;

d₃ extruding the alumina-based paste obtained from step c₃;

e₃ drying and calcining the extrudates obtained;

f₃ carrying out a hydrothermal acid treatment in a confined atmosphere on the extrudates obtained from step e₃;

g₃ optionally drying, then calcining the extrudates from step f₃.

38. A process as in claim 37, wherein the alumina-based paste after step d₃ comprises hydrargillite.

39. Alumina comprising χ and η alumina transformed from hydrargillite and γ-alumina transformed from boehmite having a total pore volume of at least 0.6 cm³ per gram, an average mesoporous diameter in the range of 140 to 360 Å; wherein said alumina is produced by a process comprising subjecting to rapid dehydration an hydrargillite, extruding the dehydrated hydrargillite with boehmite and calcining the extrudate, wherein the extrudate which is calcined comprises hydrargillite together with 8% to 62% by weight boehmite.

40. An alumina as in claim 39, wherein the extrudate which is calcined comprises hydrargillite together with 8% to 45% by weight boehmite.

41. Alumina extrudates, prepared by a process comprising: subjecting to rapid dehydration an hydrargillite having a total pore volume of at least 0.6 cm³/g, an average mesoporous diameter in the range 140 to 360 Å, and an alumina content from boehmite decomposition in the range 5% to 70% by weight.

* * * * *

UNITED STATES PATENT AND TRADEMARK OFFICE
CERTIFICATE OF CORRECTION

PATENT NO. : 6,656,875 B1
DATED : December 2, 2003
INVENTOR(S) : Le Loarer et al.

It is certified that error appears in the above-identified patent and that said Letters Patent is hereby corrected as shown below:

Column 19,
Lines 47 and 57, "claim 11" should read -- claim 11, --.
Line 66, "claim 19, the" should read -- claim 19, wherein the --.

Column 20,
Line 37, "claim 28, during" should read -- claim 28, wherein during --.

Signed and Sealed this

First Day of February, 2005

JON W. DUDAS
*Director of the United States Patent and Trademark Office*